United States Patent [19]

Oros

[11] 4,157,540

[45] Jun. 5, 1979

[54] WIRELESS ALARM SYSTEM

[75] Inventor: Stefan Oros, Cliffside Park, N.J.

[73] Assignee: Anatronics Corporation, Fairfield, N.J.

[21] Appl. No.: 702,951

[22] Filed: Jul. 13, 1976

[51] Int. Cl.$^2$ .......................... G08B 1/08; H04Q 7/00

[52] U.S. Cl. ................................ 340/539; 340/164 B; 340/527; 340/531; 340/573; 340/574; 325/111; 325/118; 325/102; 340/307

[58] Field of Search ............... 340/224, 311, 277, 539, 340/573, 574, 531, 527, 164 B; 325/111, 118, 151, 152, 169, 102, 187, 57; 11/11

[56] References Cited

U.S. PATENT DOCUMENTS

| | | | |
|---|---|---|---|
| 2,681,955 | 6/1954 | Davis | 200/52 |
| 3,257,653 | 6/1966 | McCorkindale | 340/224 |
| 3,530,451 | 9/1970 | Devine | 340/224 |
| 3,613,005 | 10/1971 | Oschbach | 325/111 |
| 3,833,895 | 9/1974 | Fecteau | 340/224 |
| 3,864,674 | 2/1975 | Worsham et al. | 340/224 |
| 3,914,692 | 10/1975 | Seaborn, Jr. | 340/224 |
| 3,956,742 | 5/1976 | Karl | 340/224 |
| 3,983,483 | 9/1976 | Pando | 325/118 |

*Primary Examiner*—John W. Caldwell, Sr.
*Assistant Examiner*—Donnie L. Crosland
*Attorney, Agent, or Firm*—Pennie & Edmonds

[57] ABSTRACT

The wireless alarm system comprises a portable wireless transmitter assembly adapted to be concealed on the person, a radio receiver and signal decoder for receiving a coded wireless signal transmitted by the radio transmitter, an adjustable timer and signal relay means for relaying the wireless alarm signal received by the radio receiver on to personnel alerting means a predetermined period of time after the wireless alarm signal is received by the radio receiver, and personnel alerting means activated by the alarm signal received from the adjustable timer and signal relay means. The portable wireless transmitter assembly comprises a pressure-actuated normally open contact switch adapted to be closed under pressure applied by the person, alerting means activated by the pressure actuated switch for alerting the person when said switch is closed, timer means activated by the pressure-actuated switch when said switch is closed, a radio transmitter activated by the timer means for transmitting a coded wireless alarm signal on at least one predetermined radio frequency, the timer means activating the radio transmitter a predetermined period of time after the pressure-actuated switch is closed, and a battery power supply for the signal feedback means, timer means and radio transmitter.

7 Claims, 13 Drawing Figures

WIRELESS ALARM SYSTEM

BACKGROUND OF THE INVENTION

1. Field of the Invention

This invention relates to wireless alarm systems for banks, police officers and other institutions and personnel requiring security alarm systems that cannot be detected or interferred with by law breakers.

2. Prior Art

Institutions such as banks, museums, stores and the like that are attractive or vulnerable to the activities of armed robbers, burglars, and other unlawful intruders frequently have alarm systems installed that alert private or public security personnel when the alarm system is activated. The alarm system may be of the automatic type that is activated, for example, when a locked door or window is opened or the beam of an electric eye is interrupted or a strange object (i.e., an intruder) in the space being protected is detected by reflected radio or sound waves. Or, it may be of the manual type that is activated by a person who sees or senses the presence of an unlawful intruder in the space being protected. A familiar example of this type of alarm system is the so called "silent alarm button" with which many bank teller's cages are equipped. All of these known alarm systems share in common several important disadvantages. They are all immobile or fixed in place and therefore of limited effectiveness. That is to say, the alarm system is activated only if a particular door or window is opened, or if a fixed beam of light is interrupted, or if an alarm button is within convenient reach of a teller or other person when needed. Moreover, they are all subject to being disabled by an intruder who first cuts or shuts off either the electric power supply for these alarm systems or the electric cable that transmits the alarm signal to the remote headquarters of the security personnel. In addition, an armed intruder may intimidate the teller or other person and thereby prevent the sounding of the alarm even when an alarm button is within reach of the person.

In order to overcome the aforementioned disadvantages of conventional alarm systems it has heretofore been proposed that certain employees of the institution (for example, guards, tellers, and the like) be provided with portable radio transmitters which, when activated by the person carrying the transmitter, transmits a radio or wireless alarm signal to a remote radio receiver which in turn, transmits the alarm signal by fixed or "hard" wiring to the site of the security personnel who are to be alerted. These known wireless alarm systems also have certain disadvantages which limit their usefulness. Most require the person carrying the portable transmitter to press a button or turn on a switch in order to activate the radio and transmit the wireless alarm signal. Such an act is usually quite noticeable and would be dangerous if not impossible to carry out in the presence of an armed robber. In addition, the person carrying the portable alarm may inadvertently press the transmitter button and thereby activate the alarm system with a false alarm. To provide for this possibility one such wireless alarm system has a time delay device incorporated in the radio receiver which delays for a predetermined period of time the transmittal of the alarm signal to the security personnel. In this system the person sending the false alarm has an opportunity to shut off the radio receiver before the alarm signal is automatically transmitted to the remote security personnel at the end of the predetermined period of time. However, this requires that the radio receiver be conveniently located where it can be reached within the predetermined time delay period, and this in turn, renders the system vulnerable to sabotage by intruders.

After an intensive investigation of the problems inherent in existing alarm systems, and in particular wireless alarm systems, I have now devised an improved wireless alarm system that enables a person wearing a portable wireless transmitter to activate the transmitter without any noticeable movement on the wearer's part, thereby activating the system despite the intimidating presence of armed intruders. The wireless transmitter assembly of my new alarm system includes a concealed pressure actuated switch for initiating the alarm sequence, an alarm alerting means for alerting the person wearing the transmitter assembly that the alarm sequence has been initiated and timer means for delaying the transmission of the alarm signal for a predetermined period of time, thereby virtually eliminating the problem of inadvertent false alarms. The radio transmitter transmits a coded alarm signal that is received by a remote radio receiver, thereby preventing accidental or intentional interference with the alarm sequence by uncoded wireless signals. The radio receiver is advantageously provided with its own independent power supply, and the alarm signal is advantageously relayed to the security personnel by a second radio transmitter so as to provide protection against sabotage. The alarm system is compatible with existing alarm systems and has other advantages which are hereinafter more fully explained.

SUMMARY OF THE INVENTION

My new wireless alarm system comprises a portable wireless transmitter assembly adapted to be concealed on the person and to transmit a coded wireless alarm signal when activated selectively by the person, a radio receiver and signal decoder for receiving the coded wireless signal transmitted by the transmitter assembly, an adjustable timer and signal relay means connected to the radio receiver for relaying the alarm signal on to the personnel alerting means of the alarm system a predetermined period of time after the coded wireless alarm signal is received by the radio receiver, and personnel alerting means activated by the alarm signal received from the adjustable timer and signal relaying means. The wireless transmitter assembly comprises a pressure actuated normally open contact switch adapted to be closed under pressure applied by the person, alerting means activated by the pressure actuated switch for alerting the person when said switch is closed, timer means activated by the pressure actuated switch when said switch is closed, a radio transmitter activated by the timer means for transmitting a coded wireless alarm signal on at least one predetermined radio frequency, the timer means activating the radio transmitter a predetermined period of time after the pressure actuated switch is closed, and a battery power supply for the alerting means, the timer means and the radio transmitter. The timer means of the transmitter assembly advantageously deactivates the alerting means a predetermined period of time after the pressure actuated switch is closed, or alternatively a second timer means can be provided to accomplish this result. The wireless transmitter assembly is advantageously provided with alarm circuit closure maintenance means and alarm circuit reset means. The alarm circuit closure maintenance means is activated when the pressure actuated switch is closed by the person and serves to initiate and maintain activation of the timer means after the pressure actuated switch is allowed to open by the person. In this regard, and as a shorthand description, the "alarm circuit closure maintenance means" may be considered a relay whereby the timer means will remain activated until the relay is reset by the alarm circuit reset means. The alarm circuit reset means is adapted to be manually operated by the person and serves to deactivate the timer means and thereby terminate the alarm sequence when actuated by the person.

The components of the portable wireless transmitter assembly are advantageously mounted serially on a belt worn by the person. The pressure actuated normally open contact switch is provided with means for adjusting the amount of pressure required to close the normally open contacts of the switch. The belt is advantageously provided with a metal belt buckle and with metal eyelets for receiving the tongue of the buckle, the metal buckle and the metal eyelets being electrically connected in series with the components of the wireless transmitter assembly whereby the electric circuit energizing the radio transmitter can be completed only when the belt is buckled.

As noted, the wireless alarm system of the invention is compatible with existing alarm systems. The alarm signal from the signal accumulator and relay can be utilized to activate a camera that makes a visually perceivable record of the area surveyed by the camera, and it can be utilized to activate other types of area protection devices such as an ultra high frequency sound generator. The portable wireless transmitter may be supplemented by microphonic sound detector devices, by radar detector devices, by ultra high frequency sound detector devices, by electric eyes and other known detection devices. The power supply for the radio receiver and signal accumulator, and for the aforementioned detection devices, is advantageously independent of external sources. Other features of the alarm system of the invention will be apparent from the following detailed description thereof.

BRIEF DESCRIPTION OF THE DRAWINGS

The alarm system of the invention will be better understood from the following description thereof in conjunction with the accompanying drawings of which.

DETAILED DESCRIPTION

Figure 10:
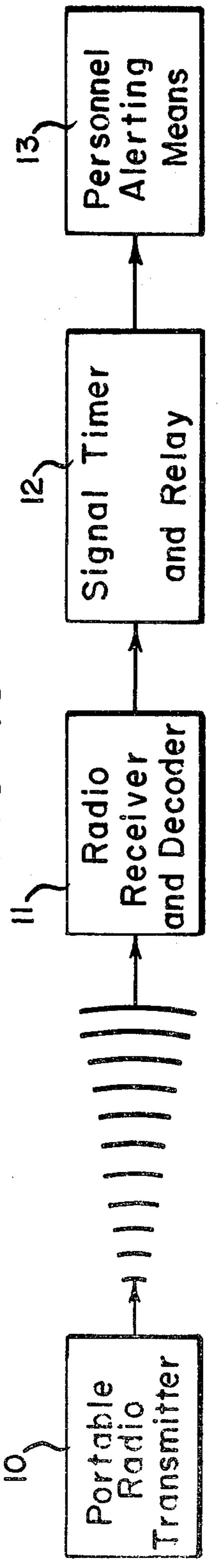
FIG. 10 is a schematic diagram showing the relationship of the basic major components of the system.

As shown best in FIG. 10 of the drawings, the wireless alarm system of the invention comprises, in brief, a portable wireless transmitter assembly 10 that is adapted to be worn on the person and that transmits a coded wireless alarm signal when activated by the person, a radio receiver and decoder 11 that receives the coded wireless alarm signal from the transmitter assembly 10, a signal timer and relay 12 that is connected to the radio receiver and decoder 11 and that relays the alarm signal on to the personnel alerting means after a predetermined period of time, and personnel alerting means 13 which may have various embodiments as hereinafter explained.

As shown best in FIGS. 1 to 9 of the drawings, the main components of the wireless transmitter assembly 10 comprise a pressure actuated normally open contact switch 14 adapted to be closed under pressure applied by the person, alerting means 15 activated by the pressure actuated switch 14 for alerting the person when the switch is closed, timer means 16 activated by the pressure actuated switch 14 when the switch is closed, a radio transmitter 17 activated by the timer 16 for transmitting a coded wireless alarm signal on at least one predetermined radio frequency, and a battery power supply 18 for the alerting means 15, the timer means 16 and the radio transmitter 17. The various components of the transmitter assembly are advantageously mounted between the plies 19*a* and 19*b* of the two-ply belt 19, the belt 19 being adapted to be worn in the usual way about the waist of the person using the device. In the embodiment of the transmitter assembly 10 shown in FIGS. 1 to 8, the belt 19 is provided with a metal belt buckle 20 having a metal tongue 21 and with metal eyelets 22 for receiving the tongue 21 of the buckle 20. The components of the transmitter assembly are electrically connected to each other and to the battery power supply 18 by the conductors 23*a*, 23*b*, 23*c* and 23*d*, the metal buckle 20 and metal eyelets 22 being electrically connected in series with the components of the transmitter assembly so that the electrical circuit that energizes the radio transmitter 17 can normally be completed only when the belt 19 is buckled. In the embodiment shown in FIG. 9, the transmitter assembly 10 includes an alarm circuit closure maintenance means or relay 24 and circuit reset means 25, the various components of the transmitter assembly being electrically connected together by means of the conductors 23*e*, 23*f*, 23*g* and 23*h*. In this embodiment, the belt buckle 20 and metal eyelets 22 are not included in the transmitter assembly circuit so that it is unnecessary to buckle the belt 19 in order to activate the alarm circuitry.

Figure 7:
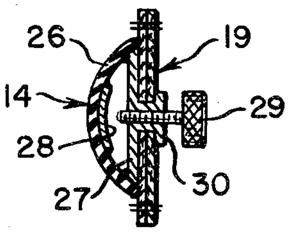
FIG. 7 is a section along line 7—7 of FIG. 1 showing the pressure actuated normally open contact switch of the transmitter assembly.
Figure 6:
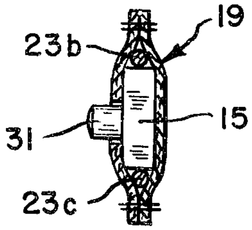
FIG. 6 is a section along line 6—6 of FIG. 1 showing the alerting means of the transmitter assembly.

Referring first to the embodiment of the transmitter assembly shown in FIGS. 1 to 8 of the drawings, the pressure activated normally open switch 14 is designed so that the electrical contacts of the switch will close when a predetermined force or pressure is applied to a pressure sensitive element of the switch. In the embodiment shown in FIG. 7 the pressure sensitive element of the switch 14 comprises a dome-like element 26 of the flexible material, such as rubber, mounted on a base member 27 that is secured to the inner surface of the belt 19. An electrical contact 28 is mounted on the inner surface of the element 26 and an adjustable electrical contact 29 is threadably mounted on a threaded bushing 30 that extends through the belt 19 as shown in FIG. 7. The pressure required to close the contacts 28 and 29 of the switch 14 is controlled by manual rotation of the threaded contact 29. The contact 29 is adjusted so that the contacts of the switch 14 will close when the person wearing the belt 19 tenses and bulges his stomach muscles and will remain closed until the person relaxes these muscles.

Figure 8:
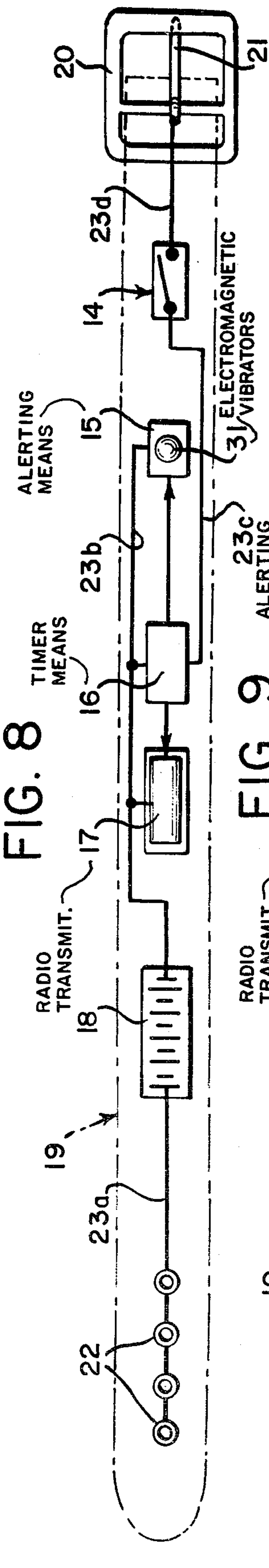
FIG. 8 is a schematic view of the belt-mounted wireless transmitter assembly of FIG. 1 showing the electrical connections between the components thereof.
Figure 9:
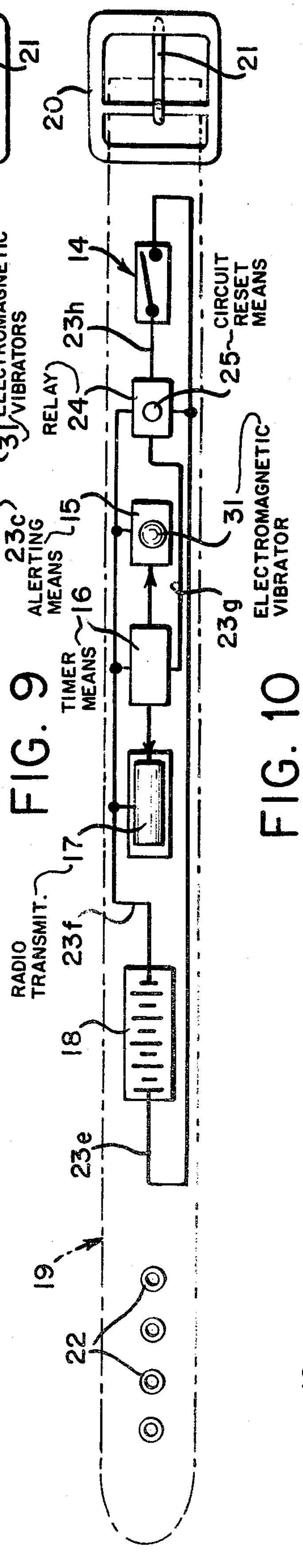
FIG. 9 is a schematic view of a modification of the belt-mounted wireless transmitter assembly incorporating an alarm circuit closure maintenance means and alarm circuit reset means and showing the electrical connections thereof.

The alerting means 15 is designed to alert the person wearing the belt 19 that the switch 14 has been closed and the alarm sequence has been initiated. The alerting means advantageously comprises a silent electromagnetic vibrator 31 that imparts a slight tingling sensation to the wearer of the belt 19 when it is activated, although audible or visual signal feedback means may also be employed to alert the person wearing the belt that the alarm sequence has been initiated. The alerting means 15 may be directly connected to the pressure actuated switch 14 so that it is activated when and only when the pressure switch is actually closed. Preferably, however, the alerting means is electrically connected to and activated by a timer means 16 that, in turn, is connected to and activated by the pressure activated switch 14 as shown in FIGS. 8 and 9, the timer means 16 activating the alerting means 15 when the switch 14 is closed by the person wearing the belt 19 as hereinafter described.

The timer means 16 is designed to initiate and control the activation of the radio transmitter 17 and, advantageously to initiate and control the activation of the alerting means 15. In the embodiment shown in FIG. 8, the timer means 16 is activated only when the pressure actuated switch 14 is closed by the person wearing the belt 19 and it is deactivated when the switch 14 is allowed to reopen by the person. Activation of the timer means 16 by closure of the switch 14 immediately initiates the alarm sequence and deactivation of the timer means 16 by reopening of the switch 14 immediately terminates the alarm sequence and, possibly, aborts the transmission of the wireless alarm signal. Specifically, when the pressure activated switch 14 is closed by the person wearing the belt 19 the timer means 16 immediately activates the alerting means 15 for a predetermined period of time (say, for 3 to 5 seconds) in order to alert the person that the alarm sequence has been initiated. The timer means 16 then activates the radio transmitter 17 a predetermined period of time after activation of the timer (for example, 5 seconds or 10 seconds after activation of the timer means) whereupon the radio transmitter immediately begins to transmit a coded wireless alarm signal. Deactivation of the timer means 16 by reopening of the switch 14 deactivates the alerting means 15 and the radio transmitter 17. If the timer means 16 is deactivated before it activates the radio transmitter 17 the alarm sequence is terminated and the transmission of the wireless alarm signal is aborted and a possible false alarm avoided. If the timer means 16 is deactivated after the radio transmitter 17 has been activated, the alarm sequence is terminated but the wireless alarm signal has already been transmitted and the alarm sounded.

Figure 1:
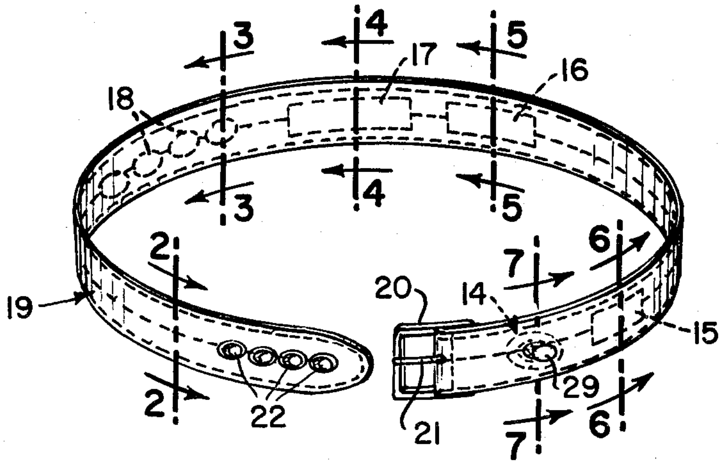
FIG. 1 is a perspective view of a belt on which the components of an advantageous embodiment of the portable wireless transmitter assembly are mounted.
Figure 2:
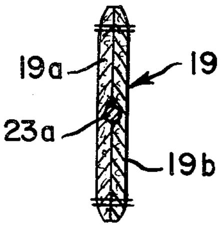
FIG. 2 is a section along line 2—2 of FIG. 1 showing the two-ply construction of the belt with concealed electrical conductors.
Figure 3:
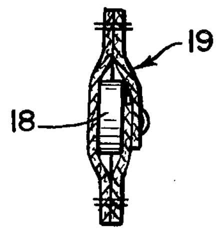
FIG. 3 is a section along line 3—3 of FIG. 1 showing the battery power supply concealed within the belt.
Figure 4:
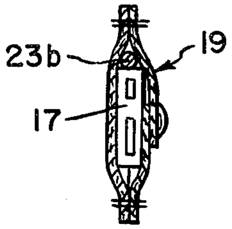
FIG. 4 is a section along line 4—4 of FIG. 1 showing the radio transmitter concealed within the belt.
Figure 5:
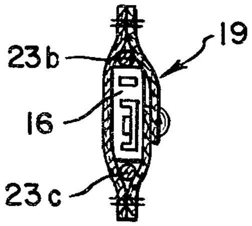
FIG. 5 is a section along line 5—5 of FIG. 1 showing the timer means concealed within the belt.

The timer means 16 is of essentially conventional design and advantageously is constructed of miniaturized solid state components. Moreover, the timer means may be a separate component of the transmitter assembly 10 as shown in FIG. 1 and FIG. 8 or it may comprise an integral part of the control circuitry of the alerting means 15 and the radio transmitter 17. In either case, the timer means serves to activate the alerting means the moment the pressure activated switch is closed and then to activate the radio transmitter 17 a predetermined time after the switch 14 is closed.

Figure 11A:
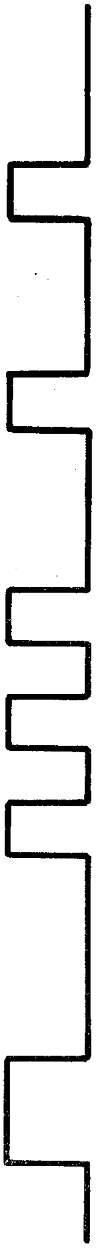
FIGS. 11*a* and 11*b* are schematic diagrams of the coded signals transmitted by two separate radio transmitter of the system.
Figure 11B:
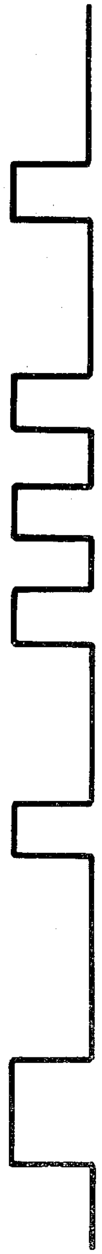

The radio transmitter 17 is designed to transmit a coded wireless signal when the transmitter is activated by the timer means 16. The coded wireless signal transmitted by the radio transmitter 17 advantageously comprises a unique sequence or pattern of pulses on one or more predetermined radio frequencies that serves to identify the particular transmitter emitting the coded signal. Thus, the radio transmitter 17 of one transmitter assembly 10 worn by one person may transmit a unique pattern of signal pulses on one frequency (for example, as indicated schematically in FIG. 11*a*) and the radio transmitter 17 of another transmitter assembly 10 worn by another person may transmit a somewhat different pattern of radio pulses on the same or on a different frequency (as indicated schematically in FIG. 11*b*), the unique coded signal transmitted by each radio transmitter 17 serving to distinguish and to identify the two transmitters and, therefore, the person transmitting an alarm signal.

The radio transmitter 17 is of essentially conventional design and advantageously is constructed of miniaturized solid state components which permit the assembly of these components into a transmitter unit small enough in size to be removably received in a snap-fastened pocket of the belt 19. Although the alarm signal transmitted by the transmitter 17 must be of sufficient strength to reach the radio receiver 11, with proper design the power consumption requirements of the transmitter are low. Accordingly, the battery power supply 18 advantageously comprises a plurality of small alkaline dry cells connected in series as shown in FIG. 1, or a single 9 volt alkaline dry cell, to supply the voltage required to operate the transmitter assembly 10.

The operation of the transmitter assembly 10 shown in FIG. 8 may be summarized as follows:

When the person wearing the belt 19 tenses and bulges his stomach muscles to close the pressure actuated switch 14 the timer means 16 is activated and the alarm sequence is initiated. The timer means 16 immediately activates the alerting means 15 for a predetermined period of time (say, about 3 to 5 seconds) thereby alerting the person that the alarm sequence has been initiated. A predetermined period of time thereafter (say, 5 seconds or 10 seconds after activation of the timer means) the timer means 16 activates the radio transmitter 17 which immediately transmits a coded wireless alarm signal to the radio receiver and decoder 11. When the person relaxes his stomach muscles and allows the switch 14 to open, the timer means 16 is deactivated and the alarm sequence is terminated. If the alarm sequence is terminated before activation of the radio transmitter 17 by the timer means 16, the transmission of an alarm signal to the radio receiver and decoder 11 is prevented. If the alarm sequence is terminated after activation of the radio transmitter 17, the wireless alarm signal is transmitted to the radio receiver and decoder 11 as hereinafter described.

Referring now to the embodiment of the transmitter assembly shown in FIG. 9 of the drawings, the transmitter assembly 10 comprises the normally open pressure actuated switch 14, alerting means 15, timer means 16, radio transmitter 17 and battery power supply 18 hereinbefore described, and as previously noted it also includes the alarm circuit closure maintenance means 24 and the alarm circuit reset means 25. The alarm circuit closure maintenance means 24 is designed to close the alarm circuit and activate the timer means 16 when the pressure actuated switch 14 is closed and to maintain the closure of the alarm circuit and consequent activation of the timer means 16 after the switch 14 has been allowed to reopen by the person wearing the belt 19. The alarm circuit closure maintenance means 24 advantageously comprises a self-energized relay switch that is initially activated when the pressure actuated switch 14 is closed and that remains activated after the switch 14 is allowed to open. As a result, when the switch 14 is closed the circuit closure maintenance means 24 will continue the activation of the timer means 16 even after the switch 14 is allowed to reopen and the alarm sequence will continue to proceed as programmed to the transmission of the coded wireless alarm signal by the radio transmitter 17 unless activation of the timer means 16 is interrupted before the commencement of the wireless transmission. The alarm circuit reset means 25 is designed to terminate activation of the timer means 16 by the alarm circuit closure maintenance means 24 and thereby interrupt the alarm sequence. The alarm circuit reset means 25 advantageously comprises a spring loaded push button positioned on the belt 19 so that it can be manually depressed by the person wearing the belt. When the alarm circuit reset means 25 is manually operated by the person wearing the belt the alarm circuit closure maintenance 24 is deactivated, thereby deactivating the timer means 16 and terminating the alarm sequence.

The operation of the transmitter assembly 10 shown in FIG. 9 may be summarized as follows:

When the person wearing the belt 19 closes the pressure actuated switch 14 the alarm circuit closure maintenance means 24 is activated and remains activated even after the switch 14 is allowed to reopen. Activation of the alarm circuit closure maintenance 24 activates the timer means 16 which, in turn, first activates the alerting means 15 and then the radio transmitter 17 as previously described. The alarm circuit closure maintenance means 24 will continue to be activated until it is deactivated by manual pressure on the alarm circuit reset means 25 by the person wearing the belt. Deactivation of the alarm circuit closure maintenance means 24 will deactivate the timer means 16 and thereby terminate the alarm sequence in the manner previously described in connection with the transmitter assembly shown in FIG. 8.

The radio receiver and decoder 11 of the wireless alarm system is designed to receive and decode the coded wireless alarm signal transmitted by the transmitter assembly 10. If the coded wireless signal received by the radio receiver and decoder 11 is one that the decoder is designed or programmed to identify and accept, the alarm signal is passed on to the signal timer and relay 12 as hereinafter described. If the wireless signal received by the radio receiver and decoder 11 is one that the signal decoder does not recognize the signal is not passed on to the signal timer and relay 12, thereby avoiding false alarms due to extraneous radio signals. The radio receiver and decoder 11 may be adapted to receive and identify only one coded wireless signal in which case it can be used only in conjunction with a transmitter assembly 10 that transmits that particular coded wireless signal. Preferably, however, the radio receiver and decoder 11 is adapted to receive and identify a plurality of differently coded wireless signals each of which is transmitted by a different transmitter assembly 10. The signal decoder is further advantageously adapted to distinguish and identify each of the wireless alarm signals received by it and to indicate by visually perceivable means the particular transmitter assembly that is the source of the signal being received. The radio receiver and signal decoder is of essentially conventional construction and is advantageously provided with its own power supply to minimize the possibility of sabotage.

The signal timer and relay 12 of the alarm system is designed to receive the alarm signal from the radio receiver and signal decoder 11 and, after a predetermined period of time, to pass the alarm signal on to the personnel alerting means 13 of the system. The timer means of the signal timer and relay 12 is advantageously manually adjustable for a predetermined time delay of from, say, 0 seconds to 60 seconds. When an alarm signal is received by the signal timer and relay 12, the timer means is activated and, after the aforesaid predetermined period of time, the alarm signal is relayed on to the personnel alerting means 13. If the alarm signal is interrupted at any time before it is relayed on to the personnel alerting means 13, the timer means of the signal timer and relay 12 will be deactivated and the alarm will be aborted. Therefore, if the timer means is adjusted to provide a time delay of, say, 10 seconds, the alarm can be aborted if the coded wireless alarm signal being received by the radio receiver and decoder 11 is interrupted at the transmitter assembly 10 at any time before the expiration of the 10 second delay period, thereby providing additional protection against accidental false alarms. Additionally, it is contemplated that the signal timer and relay 12 can abort the alarm signal by means of a second coded radio alarm signal received from the wireless transmitter assembly 10 via the radio receiver and decoder 11. To this end, the second coded radio alarm signal received by the signal timer and relay subsequent to the receipt of the first coded wireless alarm signal will activate an alarm signal cut-off means to interrupt the alarm signal to the personnel alerting means 13.

The personnel alerting means 13 may comprise any known device heretofore used for this purpose, such as bells or blinking lights, either on the immediate premises or at a remote location manned by private or public security personnel. Advantageously, the personnel alerting means 13 comprises a second radio transmitter connected to the signal timer and relay 12 and a second radio receiver located at the remote location manned by the security personnel, thereby eliminating the possibility of sabotage by cutting of an electric cable connecting the signal timer and relay 12 with the remote location of the security personnel.

Figure 12:
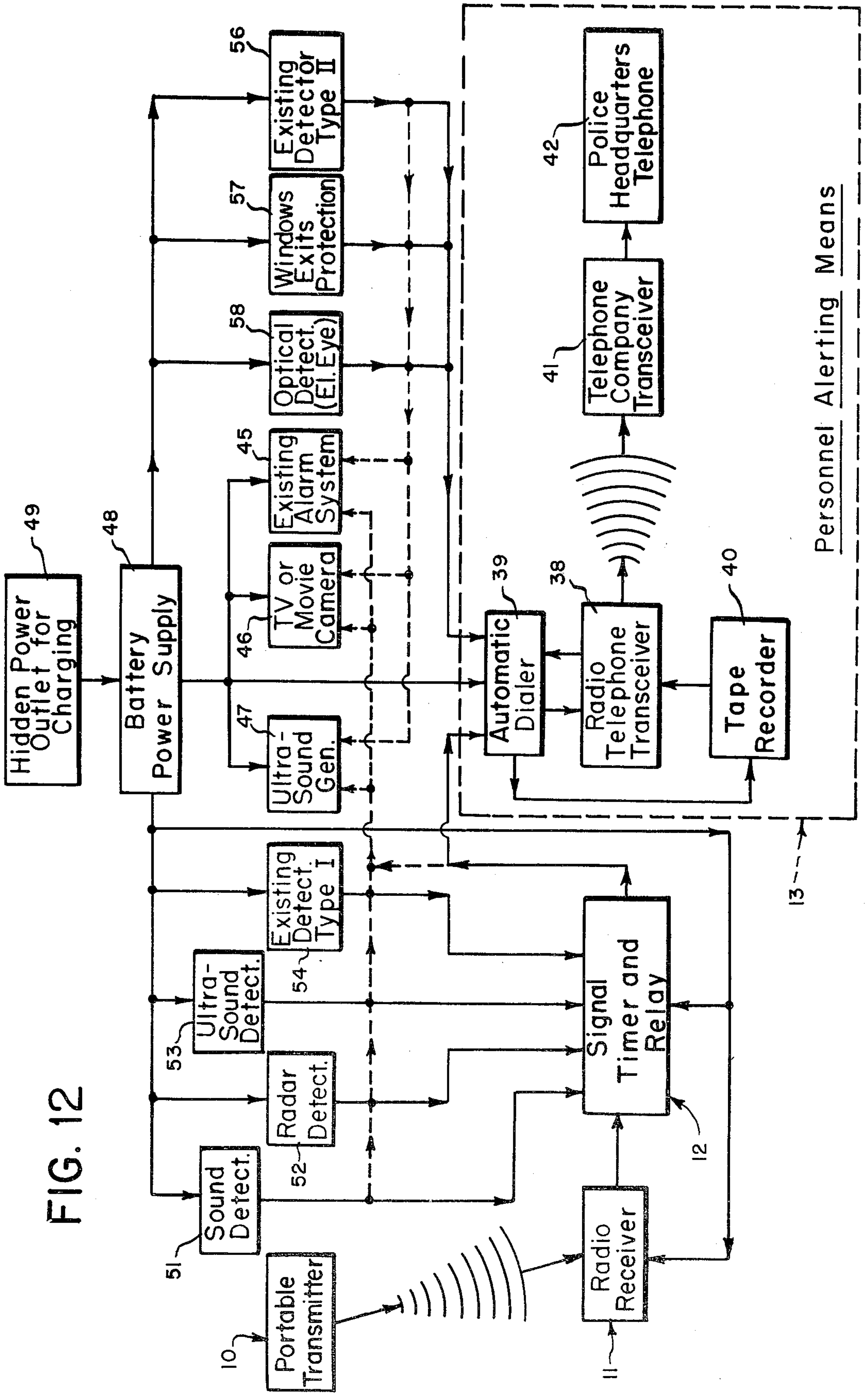
FIG. 12 is a schematic diagram of a preferred embodiment of the wireless alarm system also showing its compatibility with existing types of alarm systems.

In the preferred embodiment shown in FIG. 12, the personnel alerting means 13 comprises the aforementioned combination of second radio transmitter and second radio receiver, the second radio transmitter comprising the sub-combination of a radio telephone transmitter and receiver 38, an automatic telephone dialer 39 and a tape recorder 40, and the second radio receiver comprising the sub-combination of a remote radio telephone receiver and transmitter 41 operated by a public telephone utility and the network of telephone lines and telephones connected thereto. The radio telephone transmitter and receiver 38 (or transceiver 38) is adapted to transmit and receive radio signals on the same predetermined radio frequencies as the remote radio receiver and transmitter 41 (transceiver 41) operated by the public telephone utility. When the alarm signal is received from the signal timer and relay 12, the radio telephone transceiver 38 and automatic dialer 39 cooperate to transmit a radio signal to the radio transceiver 41 of the public telephone utility which automatically dials the telephone number of a conventional telephone instrument being monitored by the police or other security personnel. When the police or other security personnel answer the telephone call placed by the automatic dialer, the radio telephone transceiver 38 cooperates with the tape recorder 40 to transmit a prerecorded verbal alarm message to the police or other security personnel. This verbal alarm message should advise the security personnel of the origin and reason for the alarm (e.g., "There is a robbery in progress at the First National Bank").

As previously noted, the wireless alarm system of the invention is compatible with and may be an integral part of a larger alarm system composed of essentially conventional detection and security devices. Thus, in the embodiment shown in FIG. 12, when the portable transmitter assembly 10 is activated, it transmits a coded wireless alarm signal to radio receiver 11 and decoder which feeds this alarm signal to the signal timer and relay 12. After a predetermined period of time the signal timer and relay 12 transmits the alarm signal to the combination of radio telephone transceiver 38, automatic dialer 39 and tape recorder 40 which, in turn, transmits the alarm through the telephone company transceiver 41 to the police headquarters telephone 42. The alarm signal from the signal timer and relay 12 may also be utilized to activate an existing alarm system 45, such as a bell or light, on the immediate premises or at a remote location; or the alarm signal may be utilized to activate a television or movie camera 46 that makes a visually perceivable record of the area surveyed by the camera; or the alarm signal may be utilized to activate an ultra high frequency sound generator 47 that generates ultra high frequency sound waves of sufficient energy to incapacitate an intruder in the area being protected in the manner known in the art.

The portable transmitter 10 is provided with its own electric power supply. The radio receiver 11, the signal timer and relay 12, the radio telephone transceiver 38, the automatic dialer 39 and the tape recorder 40 are also advantageously supplied with electric power from a battery 48 that is independent of external sources. The battery 48 may be connected to a battery charger 49 that, in turn, is connected to an external source of electric power. However, the loss or cutting off of the external power supply would not incapacitate the alarm system as long as the battery 48 retains its charge.

The protection afforded by the portable wireless transmitter 10 may be supplemented by detector devices which are adapted to detect sound or electromagnetic energy, or other phenomena, emanating from strange objects in the area being protected. These so-called "Type I" detectors may include a microphonic sound detector 51 which is located in the area being protected and which transmits an alarm signal to the signal timer and relay 12 when it detects an extraneous sound of a predetermined frequency and intensity in the area being protected. A radar detector 52 may also be incorporated in the system, the radar detector radiating a high frequency radio wave that is reflected back to the detector by objects in the space being protected. When the radar detector 52 detects a radar echo from an extraneous or strange object in the area being protected, it transmits an alarm signal to the signal timer and relay 12 of the system. The system may also include an ultra high frequency sound detector 53 that radiates a high frequency sound wave that is reflected back to the ultra sound detector by hard objects in the space being protected. If the ultra high frequency sound detector 53 detects an ultra sound echo from an extraneous object in the area being protected, the detector transmits an alarm signal to the signal timer and relay 12. Other kinds of "Type I" detecting devices 54 may also be incorporated in the system. All of these detecting devices are advantageously supplied with electrical power by the battery 48.

The alarm signal transmitted by each of the "Type I" detectors is received by the signal timer and relay 12 which, after a predetermined period of time, relays it on to the personnel alerting means 13 of the system. In addition, the alarm signal transmitted by these detectors can be utilized to activate an existing alarm system 45 or a camera 46, or an ultra sound generator 47, as previously described.

The portable wireless transmitter 10 can also be supplemented by detectors 56 of the so-called "Type II" type that are fixed in place and that are activated by the breaking or interruption of an electrical or light or other energy circuit. These devices include, but are not limited to, electrical alarm circuits 57 which are activated when an unauthorized window or door is opened, or when a beam of light focused on an electric eye 58 is interrupted. These "Type II" devices transmit an instantaneous alarm signal to the personnel alerting means 13. In addition, the alarm signal from these devices can be utilized to activate an existing alarm 45, a camera 46, or an ultra sound generator 47, as previously described. All of these "Type II" devices are advantageously supplied with electrical power by the battery 48.

I claim:

1. A wireless alarm system activated selectively by a person which comprises:

a portable wireless transmitter assembly adapted to be concealed on the person, said assembly comprising: a pressure actuated normally open contact switch adapted to be closed under pressure applied by the person, alerting means activated by the pressure actuated switch for alerting the person by a tactually perceivable signal when said switch is closed, timer means activated by the pressure actuated switch when said switch is closed, a radio transmitter activated by said timer means for transmitting a coded wireless alarm signal on at least one predetermined radio frequency, said timer means activating the radio transmitter a predetermined period of time after the pressure actuated switch is closed, and a battery power supply for the alerting means, timer means and radio transmitter;

a radio receiver and signal decoder for receiving the coded wireless signal transmitted by the radio transmitter;

an adjustable timer and signal relay means connected to the radio receiver for relaying the alarm signal on to personnel alerting means of the alarm system a predetermined period of time after the coded wireless alarm signal is received by the radio receiver; and personnel alerting means activated by the alarm signal received from the adjustable timer and signal relay means.

2. The wireless alarm system according to claim 1 in which the timer means deactivates the alerting means a predetermined period of time after the pressure activated switch is closed.

3. The wireless alarm system according to claim 1 in which circuit closure maintenance means and circuit reset means are provided in the wireless transmitter assembly, said circuit closure maintenance means being activated when the pressure actuated switch is closed to initiate and maintain activation of the timer means after the pressure actuated switch is allowed to open by the person, and said circuit reset means deactivating said timer means when manually actuated by the person.

4. The wireless alarm system according to claim 1 in which the pressure actuated normally open contact switch is provided with means for adjusting the amount of pressure required to close the normally open contacts of the switch.

5. The wireless alarm system according to claim 1 in which the wireless transmitter assembly is adapted to be worn by the person at a position whereat the normally open contacts of the pressure actuated switch may be closed by pressure exerted by controlled tensing of the person's body muscles.

6. The wireless alarm system according to claim 1 in which the adjustable timer and signal relay means is adapted to delay the relaying of the alarm signal to the personnel alerting means for a predetermined period of time.

7. The wireless alarm system according to claim 1 in which the adjustable timer and signal relay means is provided with alarm signal cut-off means that is activated when the radio receiver and signal decoder receives a second coded radio alarm signal from the wireless transmitter assembly subsequent to the reception by said radio receiver of a first coded wireless alarm signal from the radio transmitter.

* * * * *